United States Patent [19]

Nelson

[11] 4,001,188
[45] Jan. 4, 1977

[54] DIMETHYL 2,5-DIBROMOTEREPHTHALATE ESTERIFICATION

[75] Inventor: James P. Nelson, Woodridge, Ill.

[73] Assignee: Standard Oil Company a corporation of Indiana, Chicago, Ill.

[22] Filed: Feb. 27, 1975

[21] Appl. No.: 553,828

Related U.S. Application Data

[63] Continuation-in-part of Ser. No. 263,199, June 15, 1972, abandoned.

[52] U.S. Cl. .............................. 260/75 H; 260/75 R
[51] Int. Cl.$^2$ ................. C08G 63/34; C08G 63/68
[58] Field of Search ............ 260/75 H, 75 M, 75 C

[56] References Cited

UNITED STATES PATENTS

| | | | |
|---|---|---|---|
| 2,822,348 | 2/1958 | Haslam | 260/75 R |
| 3,047,515 | 7/1962 | Piirma | 260/75 R |
| 3,265,762 | 8/1966 | Quisenberry | 260/860 |
| 3,766,146 | 10/1973 | Witsiepe | 260/75 R |

OTHER PUBLICATIONS

Cachia, *Chemical Abstracts*, vol. 54:10,944i (1960).
Bjorksten, *Polyesters and Their Applications*, Reinhold, New York, 1956, pp. 201–202.

*Primary Examiner*—Murray Tillman
*Assistant Examiner*—W. C. Danison, Jr.
*Attorney, Agent, or Firm*—William H. Magidson; Arthur G. Gilkes; William T. McClain

[57] ABSTRACT

Preparation of polyesters, particularly homopolymeric trimethylene 2,5-dibromoterephthalate, by reacting alpha, omega alkylene glycol with dimethyl 2,5-dibromoterephthalate in presence of catalytic amounts of calcium alkanoate and titanate catalyst.

3 Claims, No Drawings

DIMETHYL 2,5-DIBROMOTEREPHTHALATE ESTERIFICATION

This application is a continuation-in-part of Ser. No. 263,199 filed June 15, 1972, now abandoned.

This invention relates to the production of polyalkylene 2,5-dibromoterephthalates by reacting a polyhydric alcohol and dimethyl 2,5-dibromoterephthalate in the presence of a catalyst comprising a tetraalkyl titanate and calcium alkanoate.

The literature is replete with disclosure of catalysts suitable for reacting dimethyl terephthalate with alkylene glycols. There are also various references, such as Quiesenberry, U.S. Pat. No. 3,265,762, and Bruson, U.S. Pat. No. 3,307,964 which suggest that dimethyl dihaloterephthalates can be reacted with alkylene glycols using various catalysts. For example, Bruson discloses that calcium acetate is only suitable for polyesterification of glycol with dimethyl dichloroterephthalate if the dimethyl dichloroterephthalate is used in admixture with dimethyl terephthalate and the dimethyl terephthalate comprises at least 50 weight percent of the dimethyl esters. Studies by me indicate that calcium acetate, by itself, is ineffective as an esterification catalyst for the homopolymerization of alkylene glycol with dimethyl dibromoterephthalate. Further, while Quiesenberry discloses that dimethyl 2,5-dihaloterephthalate can be polyesterified with ethylene glycol using a titanate catalyst, my studies show that 1,3-propylene glycol can not be polyesterified with dimethyl 2,5-dibromoterephthalate using only a titanate catalyst. Accordingly, there is a need for a suitable process to producing homo polytrimethylene 2,5-dibromoterephthalate.

The general object of this invention is to provide a new process for producing polyalkylene 2,5-dibromoterephthalate. A more specific object of this invention is to provide a process for producing homopolytrimethylene 2,5-dibromoterephthalate.

The objects of this invention can be attained by esterifying an alkylene glycol with dimethyl 2,5-dibromoterephthalate using a two component catalyst comprising a tetraalkyl titanate and calcium alkanoate. In the case of the homopolymerization of trimethylene glycol with dimethyl 2,5-dibromoterephthalate, the omission of either catalyst component leads to no reaction. This is unexpected since homopolymeric polyethylene 2,5-dibromoterephthalate, polytetramethylene 2,5-dibromoterephthalate and polypentamethylene 2,5-dibromoterephthalate can all be produced using only the titanate component of the catalyst.

Briefly, this invention comprises reacting an alpha, omega alkylene glycol, preferably trimethylene glycol, containing two to 12 carbon atoms in the alkylene group with dimethyl 2,5-dibromoterephthalate at about 150° to 265° C in the presence of catalytic amounts of tetraalkyl titanate and calcium alkanoate. Typically the reactions can be completed in 1.5 to 5 hours when the upper end of the temperature range is used for part of the reaction period. Above about 265° C the polyester tends to degrade.

The alkylene glycols useful in this invention include ethylene glycol, trimethylene glycol, tetramethylene glycol, octamethylene glycol, dodecamethylene glycol, etc. If desired mixtures of one or more alpha, omega-alkylene glycols can be used.

Suitable titanate catalysts useful in this invention include the tetralkyl titanates, such as tetrapropyl titanate, tetraisopropyl titanate, tetrabutyl titanate, etc. The titanate catalysts can be used in a concentration of 0.01 to 0.20% based on the weight of dimethyl ester (2,5-dibromoterephthalate) or dimethyl esters, if dimethyl terephthalate or other ester is included in the reaction.

Suitable calcium alkanoate catalysts include calcium salts of saturated alphatic acids containing 2 to 8 carbon atoms, such as calcium acetate, calcium propionate, calcium octanoate, etc. The calcium alkanoate catalysts can also be used in a concentration of 0.01 to 0.20% based on the weight of dimethyl esters.

EXAMPLE

A mixture of 35.2 grams (0.10 moles) of dimethyl-2,5-dibromoterephthalate and 16.74 grams (0.22 moles) of 1,3-propanediol, were combined in a small glass reactor tube. The tube was combined with the reactor head, which was constructed in such a way that a nitrogen purge tube extended to about 0.25 inches from the bottom of the reactor tube and a vacuum could be maintained with a nitrogen purge. The reactor assembly was then suspended in an electrically heated oil bath with a nitrogen purge. The oil bath temperature was increased to 160° C. After the charge melted, 150 microliters tetraisopropyl titanate (neat) catalyst was injected into the reactor through the nitrogen purge tube. When the transesterification did not begin about 0.1 gram of calcium acetate was added. The transesterification reaction proceeded when the calcium acetate was added, while the oil bath temperature was held at 180°–200° C. for 1.5 hours. The temperature was then raised to 250° C. and held at 1 atm. with a nitrogen sweep for 0.5 hours. Then a vacuum was applied and maintained at 0.3–0.1 mm Hg for 2 hours. The reaction vessel was cooled. The product, poly(-trimethylene-dibromoterephthalate) was a clear, amorphous, light yellow resin. The intrinsic viscosity of the polymer was found to be 0.24. The polymer was found to contain 42.16% bromine, compared to a calculated value of 43.5%. Upon addition of ether to a solution of polymer in hot o-dichlorobenzene a crystalline polymer precipitated and was isolated. Differential thermal analysis showed a melting point of 87°–95° C., while on the hot stage polyester melting occurred at 96°–110° C. The number average molecular weight of the poly(-trimethylene dibromoterephthalate) was determined by vapor phase osmometry to be 13,750. Percent crystallinity as determined by X-ray diffraction was found to be 17%.

This polyesters of this invention are suitable for use as fire-retardant molding resins.

I claim:

1. A process for the preparation of homopolymeric trimethylene 2,5-dibromoterephthalate comprising reacting dimethyl 2,5-dibromoterephthalate with trimethylene glycol in the presence of 0.01 to 0.20% calcium salt of saturated aliphatic acids containing 2 to 8 carbon atoms based on the weight of dimethyl ester and 0.01 to 0.20% tetraalkyl titanate based on the weight of dimethyl ester at 150° to 265° C.

2. The process of claim 1, wherein said calcium salt comprises calcium acetate.

3. The process of claim 2, wherein said titanate catalyst comprises tetraisopropyl titanate.

* * * * *